US012532215B2

(12) United States Patent
Wu et al.

(10) Patent No.: US 12,532,215 B2
(45) Date of Patent: Jan. 20, 2026

(54) METHOD AND APPARATUS FOR BUFFER STATUS REPORT TRANSMISSIONS

(71) Applicant: LENOVO (BEIJING) LIMITED, Beijing (CN)

(72) Inventors: Lianhai Wu, Beijing (CN); Joachim Lohr, Wiesbaden (DE); Prateek Basu Mallick, Dreieich (DE); Jing Han, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 868 days.

(21) Appl. No.: 17/760,611

(22) PCT Filed: Sep. 25, 2019

(86) PCT No.: PCT/CN2019/107926
§ 371 (c)(1),
(2) Date: Mar. 15, 2022

(87) PCT Pub. No.: WO2021/056284
PCT Pub. Date: Apr. 1, 2021

(65) Prior Publication Data
US 2022/0295341 A1    Sep. 15, 2022

(51) Int. Cl.
*H04W 28/02*    (2009.01)
(52) U.S. Cl.
CPC ... *H04W 28/0278* (2013.01); *H04W 28/0231* (2013.01)
(58) Field of Classification Search
CPC .............. H04W 28/0278; H04W 28/0231
See application file for complete search history.

(56) References Cited

U.S. PATENT DOCUMENTS

| 3,324,095 | A | 6/1967 | Carrick et al. | |
| 11,564,124 | B2* | 1/2023 | Tesanovic | H04W 72/1263 |
| 2021/0051695 | A1* | 2/2021 | Majmundar | H04W 72/21 |
| 2021/0076404 | A1* | 3/2021 | Tsai | H04W 72/23 |

(Continued)

FOREIGN PATENT DOCUMENTS

CN    110121191 A    8/2019

OTHER PUBLICATIONS

International Searching Authority, "Written Opinion of the International Searching Authority," PCT/CN2019/107926, Jul. 14, 2020, pp. 1-4.

(Continued)

*Primary Examiner* — Christopher M Crutchfield
*Assistant Examiner* — Tito Q Pham
(74) *Attorney, Agent, or Firm* — Kunzler Bean & Adamson

(57) ABSTRACT

The present disclosure relates to methods and apparatuses. According to some embodiments of the disclosure, a method performed by a communication device, includes: receiving, at the communication device and from an access communication device, a Buffer Status Report (BSR) for uplink transmission to be carried by a plurality of Radio Link Control (RLC) channels, wherein the communication device is connected to at least two parent nodes; and transmitting a first Pre-emptive Buffer Status Report (Pre-BSR) based on the BSR to a first parent node of the at least two parent nodes after receiving the BSR.

16 Claims, 6 Drawing Sheets

(56) References Cited

U.S. PATENT DOCUMENTS

| | | | |
|---|---|---|---|
| 2021/0297895 A1* | 9/2021 | Lee | H04W 72/21 |
| 2021/0345369 A1* | 11/2021 | Teyeb | H04W 28/0278 |
| 2021/0377787 A1* | 12/2021 | Zhuo | H04W 72/23 |
| 2022/0022093 A1* | 1/2022 | Liu | H04W 28/0278 |
| 2022/0094425 A1* | 3/2022 | Wei | H04W 88/04 |
| 2022/0159506 A1* | 5/2022 | Liu | H04W 72/12 |
| 2022/0167382 A1* | 5/2022 | Zhuo | H04W 72/1263 |
| 2022/0232607 A1* | 7/2022 | Fujishiro | H04W 72/1263 |
| 2022/0272723 A1* | 8/2022 | Cho | H04W 72/52 |

OTHER PUBLICATIONS

Huawei, Hisilicon, Pre-BSR Enabling Fast Scheduling, 3GPP TSG-RAN WG2 Meeting 103bis, R2-1815504, Oct. 8-12, 2018, pp. 1-3, Chengdu, China.

ZTE Corporation, Sanechips, Discussion on low latency scheduling in IAB, 3GPP TSG RAN WG2 Meeting #106, R2-1906571, May 13-17, 2019, pp. 1-4, Reno, NV, USA.

ASUSTEK, Discussion on SR/BSR triggering in multi-hop IAB network, 3GPP TSG-RAN WG2 Meeting #106, R2-1906538, May 13-17, 2019, pp. 1-4, Reno, USA.

* cited by examiner

METHOD AND APPARATUS FOR BUFFER STATUS REPORT TRANSMISSIONS

TECHNICAL FIELD

The present disclosure generally relates to wireless communication technology, and more particularly to buffer status report transmissions in a wireless communication system.

BACKGROUND

In wireless communication systems, a buffer status reporting procedure is used to provide information about the size of data in uplink (UL) buffers of a User Equipment (UE) to a Base Station (BS) serving the UE. A Buffer Status Report (BSR) may be triggered when UL data arrives at a UE transmission buffer. There is a need for efficiently scheduling BSR transmissions.

SUMMARY OF THE DISCLOSURE

An embodiment of the present disclosure provides a method performed by a communication device. The method may include receiving, at the communication device and from an access communication device, a Buffer Status Report (BSR) for uplink transmission to be carried by a plurality of Radio Link Control (RLC) channels, wherein the communication device may be connected to at least two parent nodes; and transmitting a first Pre-emptive Buffer Status Report (Pre-BSR) based on the BSR to a first parent node of the at least two parent nodes after receiving the BSR. The RLC channels may include: at least one User Equipment (UE) Data Radio Bearer (DRB); at least one Backhaul (BH) ingress RLC channel; or any combination thereof.

In an embodiment of the present application, the method may include receiving, from a base station, configuration information indicating association of each of the plurality of RLC channels between the communication device and the access communication device with one of the at least two parent nodes.

In an embodiment of the present application, the configuration information may further indicate that Logical Channels (LCHs) from the same ingress LCGs between the communication device and the access communication device are not configured to be transmitted to different parent nodes of the communication device. In an embodiment of the present application, the BSR may indicate buffer size for each of ingress Logical Channel Groups (LCGs) between the communication device and the access communication device, and Logical Channels (LCHs) in the same ingress LCG may be configured to be associated with the same parent node of the communication device. The BSR may indicate a first buffer size for a first ingress LCG of between the communication device and the access communication device, and LCHs in the first ingress LCG may be configured to be associated with the first parent node. The first Pre-BSR may indicate a second buffer size for a first egress LCG between the communication device and the first parent node, and the second buffer size for the first egress LCG may be based on the first buffer size for the first ingress LCG.

In an embodiment of the present application, the BSR may indicate a third buffer size for a first ingress Logical Channel Group (LCG) between the communication device and the access communication device, and a forth buffer size for a second ingress LCG between the communication device and the access communication device, a plurality of first Logical Channels (LCHs) in the first ingress LCG may be configured to be associated with the same parent node, and a plurality of second LCHs in the second ingress LCG may be configured to be associated with more than one parent node of the at least two parent nodes. In an embodiment of the present application, the first Pre-BSR may indicate a fifth buffer size for a first egress LCG between the communication device and the first parent node; and if at least one LCH in the first ingress LCG is configured to be associated with the first parent node, the fifth buffer size for the first egress LCG may be based on at least the third buffer size of the first ingress LCG. In an embodiment of the present application, the first Pre-BSR may indicate a fifth buffer size for a first egress LCG between the communication device and the first parent node; and if at least one LCH in the second ingress LCG is configured to be associated with the first parent node, the fifth buffer size for the first egress LCG may be based on at least the fourth buffer size of the second ingress LCG. In an embodiment of the present application, if at least one LCH in the second ingress LCG is configured to be associated with the first parent node, and at least one different LCH in the second ingress LCG is configured to be associated with a second parent node of the more than one parent nodes, the method may further include transmitting a second Pre-BSR based on the BSR to the second parent node after receiving the BSR. The second Pre-BSR may indicate a sixth buffer size for a second egress LCG between the communication device and the second parent node; and the sixth buffer size for the second egress LCG may be based on at least the fourth buffer size of the second ingress LCG.

In another embodiment of the present application, the method may include: selecting the first parent node from the at least two parent nodes for transmitting the first Pre-BSR after receiving the BSR from the access communication device. The first patent node may be selected based on channel qualities or loading of the at least two patent nodes. The BSR may indicate buffer size for each of ingress Logical Channel Groups (LCGs), and Logical Channels (LCHs) in the same ingress LCG may be configured to be associated with the at least two parent nodes of the communication device. The first Pre-BSR may indicate a second buffer size for a first egress LCG between the communication device and the first parent node, and the second buffer size for the first egress LCG may be based on a first buffer size for a first ingress LCG indicated in the BSR.

In yet another embodiment of the present application, the method may include: receiving, from a base station, configuration information indicating association of RLC channels between the communication device and the access communication device with the at least two parent nodes, wherein each RLC channel is configured to be associated with two or more parent nodes of the at least two parent nodes. The BSR may indicate buffer size for each of ingress Logical Channel Groups (LCGs) between the communication device and the access communication device, and Logical Channels (LCHs) in a first ingress LCG between the communication device and the access communication device may be configured to be associated with both of the first parent node and a second parent node of the two or more parent nodes. The method may include: transmitting the first Pre-BSR based on the BSR to the second parent node after receiving the BSR, wherein the uplink transmission may be via both the first parent node and the second parent node.

Another embodiment of the present disclosure provides a method performed by a base station. In an embodiment of the present application, the method may include transmitting, to a communication device, a first configuration information indicating association of Radio Link Control (RLC) channels between the communication device and an access communication device of the communication device with at least two parent nodes of the communication device, wherein each RLC channel is associated with one of the at least two parent nodes; and receiving uplink transmission from the access communication device via the communication device. The RLC channels may include: at least one User Equipment (UE) Data Radio Bearer (DRB); at least one Backhaul (BH) ingress RLC channel; or any combination thereof.

In an embodiment of the present application, the method may include transmitting, to the communication device, a second configuration information comprising information indicating mapping of ingress Logical Channels (LCHs) between the communication device and the access communication device to ingress Logical Channel Groups (LCGs), wherein ingress LCHs that are mapped to the same ingress LCG may be configured to be associated with the same parent node of the communication device.

In an embodiment of the present application, the method may include transmitting, to the communication device, a second configuration information comprising information indicating mapping of ingress Logical Channels (LCHs) between the communication device and the access communication device to ingress Logical Channel Groups (LCGs), wherein ingress LCHs that are mapped to the same ingress LCGs may not be configured to be associated with different parent nodes of the communication device.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
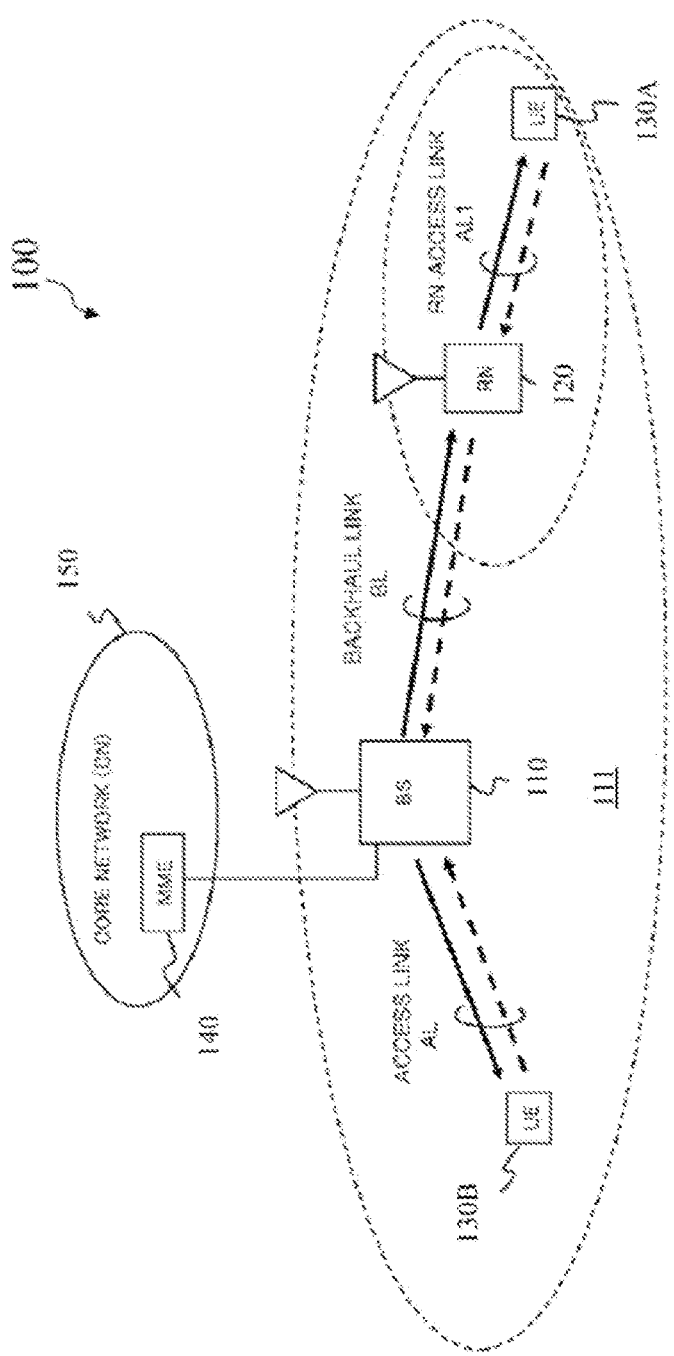
FIG. 1 illustrates a schematic wireless communication system according to some embodiments of the present disclosure.

FIG. 1 illustrates a wireless communication system 100 according to some embodiments of the present disclosure.

Referring to FIG. 1, a wireless communication system 100 may include some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or fewer nodes in some other embodiments of the present disclosure. Although, for simplicity, merely two UEs are illustrated in FIG. 1, it is also contemplated that wireless communication system 100 may include more or fewer UEs in some other embodiments of the present disclosure.

The BS 110, which communicates with a Core Network (CN) 150, may operate or work under the control of a Mobility Management Entity (MME) 140. The core network may include a Home Subscriber Server (HSS) (not illustrated in FIG. 1), which is communicatively coupled with the MME. The BS 110 may operate, for example based on a standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). The UE 130A may include, for example, but is not limited to, a computing device, a wearable device, a mobile device, an IoT device, etc. The UE 130B may include a device that is the same or similar to the UE 130A. The UE 130B may also include a device different from the UE 130A. Persons skilled in the art should understand that as technology develops and advances, the terminologies described in the present disclosure may change, but should not affect or limit the principles and spirit of the present disclosure.

The BS 110 (or a Donor BS) may establish radio connections with the UE 130B and the RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, the RN 120 may establish a radio connection with the UE 130A through an RN-access link (AL1) based on protocol Layer-1 to Layer-3. In some other embodiments of the present disclosure, the RN 120 may establish a radio connection with the UE 130A through the AL1 based on protocol Layer-1 to Layer-2.

Although FIG. 1 merely shows that the Donor BS 110 is connected to two UEs for simplicity, it is contemplated that the Donor BS 110 may provide or establish connections with more or less UEs. Similarly, although FIG. 1 merely shows that the RN 120 is connected to a single UE for simplicity, it is contemplated that the RN 120 may also provide or establish connections with multiple UEs.

Deployment of RN(s) helps to enhance and/or extend coverage of a BS by a backhaul link. Evolved Universal Terrestrial Radio Access Network (E-UTRAN) supports relaying by having an RN wirelessly connect to an eNB serving the RN, called Donor eNB (DeNB), via a modified version of the Evolved Universal Terrestrial Radio Access (E-UTRA) radio interface, i.e., the BL, also referred to as the Un interface. The radio interface that provides radio protocol connection between RN and the UE is referred to as the Uu interface. Relay function and use of RN/DeNB entities in a network is transparent to the operations of the connected UEs.

3GPP is envisioning an IAB architecture for 5G (NR) communication networks supporting multi-hop relays. In other words, an IAB node may reach the IAB Donor through one or more IAB nodes. A single hop may be considered as a special instance of multiple hops. Multi-hop backhauling is relatively beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques. Multi-hop backhauling further enables backhauling around obstacles (e.g., buildings in urban environments for in-clutter deployments).

Figure 2A:
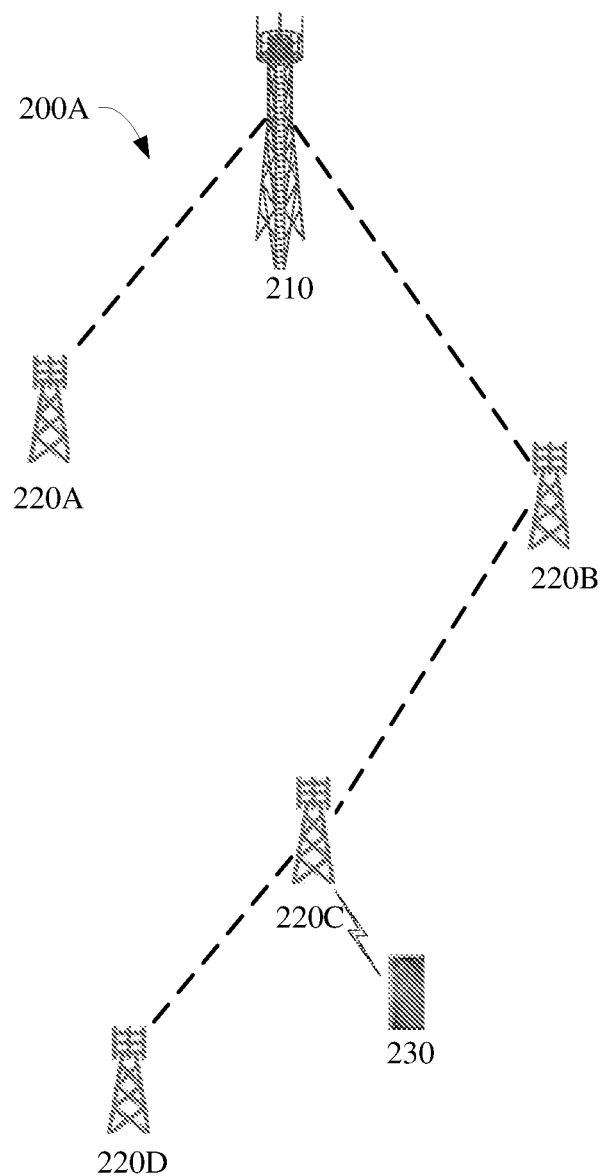
FIG. 2A illustrates a schematic wireless communication system according to some embodiments of the present disclosure.

FIG. 2A illustrates a schematic wireless communication system 200A according to some embodiments of the present disclosure.

Referring to FIG. 2A, the wireless communication system 200A may include a Donor node (e.g., IAB Donor 210), some IAB nodes (e.g., IAB node 220A, IAB node 220B, IAB node 220C, and IAB node 220D), and some UEs (e.g., UE 230). Although merely one Donor node is illustrated in FIG. 2A for simplicity, it is contemplated that a wireless communication system 200A may include more Donor node(s) in some other embodiments of the present disclosure. Similarly, although merely four IAB nodes are illustrated in FIG. 2A for simplicity, it is contemplated that the wireless communication system 200A may include more or fewer IAB nodes in some other embodiments of the present disclosure. Although merely one UE is illustrated in FIG. 2A for simplicity, it is contemplated that the wireless communication system 200A may include more UEs in some other embodiments of the present disclosure.

IAB node 220A and IAB node 220B can be directly connected to IAB Donor 210. IAB Donor 210 is a parent node of IAB node 220A and IAB node 220B. IAB node 220C can reach IAB Donor 210 by hopping through IAB node 220B. IAB node 220B is a parent IAB node of IAB node 220C. In other words, IAB node 220C may be a child IAB node of IAB node 220B.

IAB node 220D can reach IAB Donor 210 by hopping through IAB node 220C and IAB node 220B. IAB node 220B and IAB node 220C may be upstream IAB nodes of IAB node 220D, and IAB node 220C may be a parent IAB node of IAB node 220D. IAB node 220C and IAB node 220D may be downstream IAB nodes of IAB node 220B.

UE 230 can be directly connected to IAB node 220C. In other words, UE 230 may be served by IAB node 220C. IAB node 220C, IAB node 220D, and UE 230 may be downstream nodes of IAB node 220B. IAB node 220D and UE 230 may be child nodes (or access communication devices) of IAB node 220C.

Although IAB node 220A and IAB node 220B are connected to the same Donor node, i.e., IAB Donor 210, in FIG. 2A, IAB node 220A and JAB node 220B may be connected to different Donor nodes in accordance with some other embodiments of the present disclosure.

Each of IAB node 220A, IAB node 220B, IAB node 220C, and IAB node 220D may be directly connected to one or more UE(s) in accordance with some other embodiments of the present disclosure.

Each of IAB node 220A, IAB node 220B, IAB node 220C, and IAB node 220D may be directly connected to one or more IAB node(s) in accordance with some other embodiments of the present disclosure.

Figure 2B:
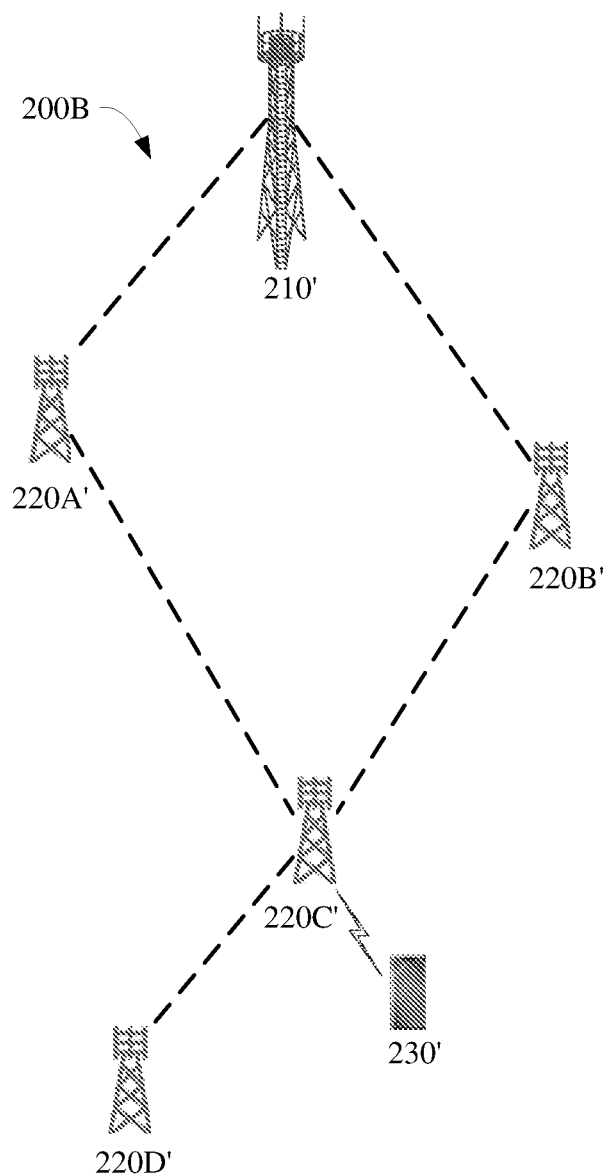
FIG. 2B illustrates a schematic wireless communication system according to some embodiments of the present disclosure.

FIG. 2B illustrates a schematic wireless communication system 200B according to some embodiments of the present disclosure.

As shown in FIG. 2B, the wireless communication system 200B may include a Donor node (e.g., IAB Donor 210'), some IAB nodes (e.g., IAB node 220A', IAB node 220B', IAB node 220C', and IAB node 220D'), and some UEs (e.g., UE 230').

The above descriptions regarding the IAB Donor 210, IAB node 220A, IAB node 220B, IAB node 220C, and IAB node 220D and UE 230 in FIG. 2A can also be applied to the wireless communication system 200B in FIG. 2B except that in the wireless communication system 200B, multi-connectivity is configured for one or more IAB nodes (e.g., IAB node 220C'). Dual-connectivity may be considered a special instance of multi-connectivity. In some examples, IAB Donor 210' may configure that IAB node 220A' is a Master Node (MN) and IAB node 220B' is a Secondary Node (SN) at IAB node 220C'. For example, IAB Donor 210' may configure to IAB node 220C' that the Cell Group (CG) ID of IAB node 220A' is "0," which indicates that IAB node 220A' is a MN. IAB Donor 210' may configure to IAB node 220C' that the CG ID of IAB node 220B' is "1," which indicates that IAB node 220B' is a SN.

For example, as shown in FIG. 2B, the IAB node 220C' may be connected to more than one parent IAB nodes, including the IAB node 220A' and the IAB node 220B'. In other words, the IAB node 220A' and the IAB node 220B' share a child IAB node, e.g., the IAB node 220C'. In this scenario, the IAB node 220C', would have a plurality of routes to the Donor node, e.g., the IAB Donor 210', via a plurality of parent IAB nodes, e.g., the IAB node 220A' and the IAB node 220B'. For example, the IAB node 220C' can reach the IAB Donor 210' by hopping through the IAB node 220A' (route A: IAB Donor 210'↔IAB node 220A'↔IAB node 220C'). Alternatively, the IAB node 220C' can reach the IAB Donor 210' by hopping through the IAB node 220B' (route B: IAB Donor 210'↔IAB node 220B'↔IAB node 220C'). From the perspective of the downstream nodes of the IAB node 220C' (e.g., the IAB node 220D'), the IAB node 220D' also has plurality of routes to the IAB Donor 210' via the IAB node 220C'. Please note that multi-connectivity may also be configured for one or more other IAB nodes in the wireless communication system.

In some embodiments of the present disclosure, only one route of a plurality of routes from an IAB node to an IAB Donor may be active, and the remaining routes of the plurality of routes may be in a backup state. Data transmission and reception may not be allowed on a route in the backup state. For example, referring to FIG. 2B, at the IAB node 220C', route A (IAB Donor 210'↔IAB node 220A'↔IAB node 220C') may be active, but route B (IAB Donor 210'↔IAB node 220B'↔IAB node 220C') may be in a backup state. In other words, the IAB node 220C' may be connected to the IAB node 220B', but there may be no data communication (e.g. data transmission or receiving) on route B at that time.

In some embodiments of the present disclosure, two or more routes of a plurality of routes from an IAB node to an IAB Donor may be active. For example, referring to FIG. 2B, at IAB node 220C', both route A and route B may be active. In other words, IAB node 220C' may transmit or receive data on both route A and route B at the same or different times.

In some embodiments of the present disclosure, an IAB Donor may configure an association of Radio Link Control (RLC) channels, which may carry uplink transmissions between an IAB node and its child nodes, with one or more parent nodes of the IAB node. In other words, uplink transmissions from the child nodes of the IAB node may be transmitted to the IAB Donor through the one or more parent nodes of the IAB node as configured by the IAB Donor.

For example, in some embodiments of the present disclosure, an IAB Donor may configure an IAB node in a manner that each of the RLC channels between the IAB node and a child node of the IAB node is associated with one parent node (hereinafter, "associated parent node") of the IAB node. Such a configuration is hereinafter referred to as Multi-connectivity Scheme I. Under this scheme, local link selection is not supported at an IAB node. At an IAB node, one RLC entity and one Backhaul Adaptation Protocol (BAP) entity may be configured for each RLC channel. Under this scheme, each RLC entity at an IAB node is configured to be associated with one peer RLC entity at the associated parent node; and each BAP entity at an IAB node is configured to be associated with one peer BAP entity at the associated parent node.

For example, referring to FIG. 2B, IAB Donor 210' may configure that RLC channel A (which may carry uplink transmission for voice communication) between IAB node 220C' and one of its child nodes (e.g., UE 230') is associated with one parent node (e.g., IAB node 220B') of IAB node 220C'. IAB Donor 210' may configure RLC channel B (which may carry uplink transmission for streaming media communication) between IAB node 220C' and UE 230' is associated with a different parent node (e.g., IAB node 220A') or the same parent node (e.g., IAB node 220B').

In some other embodiments of the present disclosure, an IAB Donor may configure an IAB node in a manner that each of the RLC channels between the IAB node and a child node of the IAB node is associated with two or more parent nodes (hereinafter, "associated parent nodes") of the IAB node, and the IAB node may select one of the associated parent nodes for transmitting data of a RLC channel. Such a configuration is hereinafter referred to as Multi-connectivity Scheme II. Under this scheme, local link selection is supported at an IAB node. As mentioned above, at an IAB node, one RLC entity and one Backhaul Adaptation Protocol (BAP) entity may be configured for each RLC channel. Under this scheme, each RLC entity (or BAP entity) at an IAB node may be configured to be associated with two or more peer RLC entities (or BAP entities) at the two or more associated parent nodes. The IAB node may select one associated parent node for data transmission.

For example, referring to FIG. 2B, IAB Donor 210' may configure that the RLC channels (e.g., RLC channel A and RLC channel B) between IAB node 220C' and UE 230' are associated with both IAB node 220A' and IAB node 220B'. IAB node 220C' may autonomously select either IAB node 220A' or IAB node 220B' for forwarding uplink transmissions carried by the RLC channels between IAB node 220C' and UE 230'.

In yet other embodiments of the present disclosure, an IAB Donor may configure an IAB node in a manner that each of the RLC channels between the IAB node and a child node of the IAB node is associated with two or more parent nodes (hereinafter, "associated parent nodes") of the IAB node, and the IAB node may transmit uplink transmission to each associated parent node. Such a configuration is hereinafter referred to as Multi-connectivity Scheme III. Under this scheme, duplicated links are supported at an IAB node. As mentioned above, at an IAB node, one RLC entity and one Backhaul Adaptation Protocol (BAP) entity may be configured for each RLC channel. Under this scheme, each RLC entity (or BAP entity) at an IAB node may be configured to be associated with two or more peer RLC entities (or BAP entities) at the two or more associated parent nodes. The IAB node may transmit duplicated data to the two or more associated parent nodes.

For example, referring to FIG. 2B, IAB Donor 210' may configure that the RLC channels (e.g., RLC channel A and RLC channel B) between IAB node 220C' and UE 230' are associated with both IAB node 220A' and IAB node 220B'. IAB node 220C' may transmit uplink transmissions carried by the RLC channels between IAB node 220C' and UE 230' to both IAB node 220A' and IAB node 220B'. In this way, reliability in uplink transmission may be improved.

The RLC channels between an IAB node and its child UEs may include at least one UE Data Radio Bearer (DRB). The RLC channels between an IAB node and its child IAB nodes may include at least one Backhaul (BH) ingress RLC channel.

Figure 3:
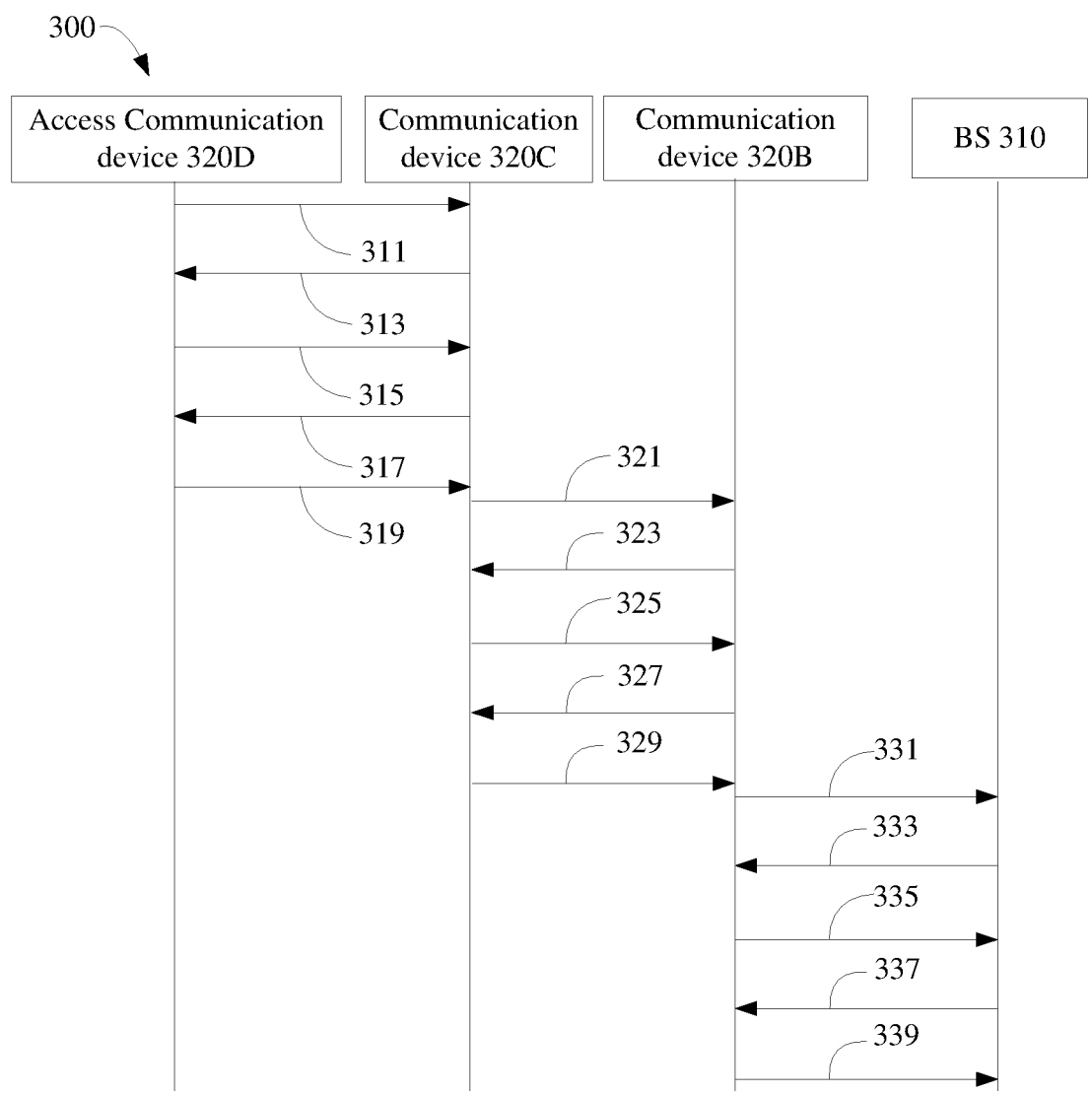
FIG. 3 illustrates a flow chart of an exemplary procedure of handling a UL transmission according to some embodiments of the present disclosure.

FIG. 3 illustrates a flow chart of an exemplary procedure 300 of handling a UL transmission according to some embodiments of the present disclosure.

In FIG. 3, access communication device 320D can reach BS 310 by hopping through communication device 320C and communication device 320B. The communication device 320C can reach the BS 310 by hopping through the communication device 320B.

In some examples, the communication device 320B may function as the IAB node 220B shown in FIG. 2A or the IAB node 220B' shown in FIG. 2B, the communication device 320C may function as the IAB node 220C shown in FIG. 2A or the IAB node 220C' shown in FIG. 2B, the access communication device 320D may function as the IAB node 220D or the UE 230 shown in FIG. 2A or the IAB node 220D' or the UE 230' shown in FIG. 2B, and the BS 310 may function as the IAB Donor 210 shown in FIG. 2A or the IAB Donor 210' shown in FIG. 2B.

Referring to FIG. 3, the access communication device 320D may have UL data to be transmitted on at least one logical channel. The access communication device 320D may, in operation 311, transmit a Scheduling Request (SR) to its parent node (e.g., the communication device 320C) for requesting, for example, Uplink Shared Channel (UL-SCH) resources.

In some embodiments of the present disclosure, a SR may be associated with the at least one logical channel having data for transmission. Each logical channel may be allocated to a Logical Channel Group (LCG). The parameters for allocating the logical channels are defined in 3GPP specification TS 38.321. A LCG may include at least one logical channel, for example, four logical channels.

In operation 313, the access communication device 320D may receive a UL grant from the communication device 320C for a UL transmission. In operation 315, the access communication device 320D may transmit a Buffer Status Report (BSR) to the communication device 320C. The communication device 320C may allocate uplink resource for subsequent data transmission from access communication device 320D.

In some embodiments of the present disclosure, a BSR may be transmitted in a MAC Control Element (CE) of a MAC Protocol Data Unit (PDU). In the header of a MAC PDU, there may be a subheader indicating that the MAC CE includes a BSR. For example, in the header of a MAC PDU, there may be one corresponding field (e.g., Logical Channel ID (LCID) field) indicating the type of the BSR. The formats for MAC PDU are defined in 3GPP specification TS 38.321.

In some embodiments of the present disclosure, a BSR may indicate buffer status (e.g., buffer size) for at least one logical channel group. The at least one logical channel group may include at least one logical channel. Each logical channel may correspond to a RLC channel (e.g., a UE DRB or a BH ingress RLC channel).

For example, a BSR may include buffer size information for logical channel group LCG #A, which may include logical channels LCH #A-1 and LCH #A-2. The BSR may further include buffer size information for logical channel group LCG #B, which may include logical channels LCH #B-1 and LCH #B-2. The logical channels included in the at least one logical channel group may be hereinafter referred to logical channels associated with the BSR or logical channels included in the BSR. The mapping of logical channels to logical channel groups may be preconfigured by a base station (e.g., BS 310).

Ingress logical channels of a communication device (e.g., the communication device 320C) refer to logical channels from a child communication device (e.g., the access communication device 320D) to the communication device, and may also be referred to as ingress logical channels between the communication device and the child communication device. Egress logical channels of a communication device (e.g., the communication device 320C) refer to logical channels from the communication device to a parent communication device (e.g., the communication device 320B), and may also be referred to as egress logical channels between the communication device and the parent communication device.

At a communication device (e.g., the communication device 320C), ingress logical channels of the communication device may be mapped to corresponding egress logical channels of the communication device. The mapping between the ingress logical channels and the egress logical channels may be preconfigured by a base station (e.g., BS 310).

For example, the communication device 320C may receive data from logical channels LCH #D-1 and LCH #D-2 from the access communication device 320D, and may receive data from logical channels LCH #E-1, LCH #E-2, and LCH #E-3 from a different child node (e.g., communication device 320E, which is not shown in FIG. 3). Logical channels LCH #D-1 and LCH #D-2 may be associated with logical channel group LCG #D-1, logical channels LCH #E-1 and LCH #E-2 may be associated with logical channel group LCG #E-1, and logical channel LCH #E-3 may be associated with logical channel group LCG #E-2. The communication device 320C may transmit data to a parent node (e.g., the communication device 320B) via logical channels LCH #C-1, LCH #C-2, and LCH #C-3, which may be associated with logical channel groups LCG #C-1, LCG #C-2, and LCG #C-3, respectively. At the communication device 320C, ingress logical channels LCH #D-1 and LCH #E-1 may be mapped to egress logical channel LCH #C-1, ingress logical channels LCH #D-2 and LCH #E-2 may be mapped to egress logical channel LCH #C-2, and ingress logical channel LCH #E-3 may be mapped to egress logical channel LCH #C-3. The mapping of the ingress logical channels and egress logical channels is as follows.

TABLE 1

| Ingress logical channel | Egress logical channel |
| --- | --- |
| LCH#D-1 (in LCG#D-1) | LCH#C-1 (in LCG#C-1) |
| LCH#E-1 (in LCG#E-1) | |
| LCH#D-2 (in LCG#D-1) | LCH#C-2 (in LCG#C-2) |
| LCH#E-2 (in LCG#E-1) | |
| LCH#E-3 (in LCG#E-2) | LCH#C-3 (in LCG#C-3) |

In operation 317, the communication device 320C may transmit to the access communication device 320D a UL grant for subsequent data transmission from access communication device 320D. In operation 319, the access communication device 320D may transmit UL data to communication device 320C with the uplink resource allocated by communication device 320C.

After receiving a UL transmission from a child communication device (e.g. the access communication device 320D), the communication device 320C may perform a similar UL scheduling as described above with respect to operations 311-319.

For example, in operation 321, the communication device 320C may transmit a SR to its parent node (e.g., the communication device 320B). In operation 323, the communication device 320C may receive a UL grant from the communication device 320B for the UL data transmission.

In operation 325, the communication device 320C may transmit a BSR to the communication device 320B. The communication device 320B may allocate uplink resource for subsequent data transmission from the communication device 320C.

In operation 327, the communication device 320B may transmit to the communication device 320C a UL grant for the subsequent data transmission from the communication device 320C. In operation 329, the communication device 320C may transmit UL data to the communication device 320B with the uplink resource allocated by the communication device 320B.

After receiving a UL data transmission from a child communication device (e.g., the communication device 320C), the communication device 320B may perform a similar UL scheduling as described above with respect to operations 311-319 and operations 321-329.

For example, in operation 331, the communication device 320B may transmit a SR to its parent node (e.g., the BS 310). In operation 333, the communication device 320B may receive a UL grant from the BS 310 for UL data transmission.

In operation 335, the communication device 320B may transmit a BSR to the BS 310. The BS 310 may allocate uplink resource for subsequent data transmission from the communication device 320B.

In operation 337, the BS 310 may transmit to the communication device 320B a UL grant for subsequent data transmission from the communication device 320B. In operation 339, the communication device 320B may transmit a UL data to the BS 310 with the uplink resource allocated by the BS 310.

In some embodiments of the present disclosure, when there are available UL resources (e.g., Physical Uplink Shared Channel (PUSCH) resources) for a communication device to send a BSR, a SR may be cancelled. In this scenario, operations 311, 313, 321, 323, 331 and 333 in FIG. 3 described above may be cancelled.

When there are no available UL resources for a communication device to send the BSR, the SR may be sent to the parent node of the communication device to require the parent node to allocate resources for the communication device, as described above with respect to operations 311, 313, 321, 323, 331 and 333 in FIG. 3.

In the exemplary procedure 300 shown in FIG. 3, a communication device may transmit a BSR to its parent node after the communication device receives UL data from its child node. Namely, the received data is stored in a buffer of the communication device. Such BSR may be hereinafter referred to as BSR or regular BSR, if NOT specifically indicated.

Another solution for handling UL data transmission is to transmit a BSR to a parent node before a communication device receives the UL data from its child node, which may reduce latency resulted from UL scheduling. For example, in some embodiments of the present disclosure, the communication device may transmit a BSR to its parent node after it receives an SR or a BSR from its child node. In some embodiments of the present disclosure, the parent node may transmit a BSR to its parent node after it transmits a UL grant to its child node. Such BSR that is transmitted before the reception of the UL data from the child node are hereinafter referred to as a Pre-emptive BSR (Pre-BSR). The UL scheduling procedure employing the Pre-BSR will be described in detail in the following text with respect to FIG. 4.

Figure 4:
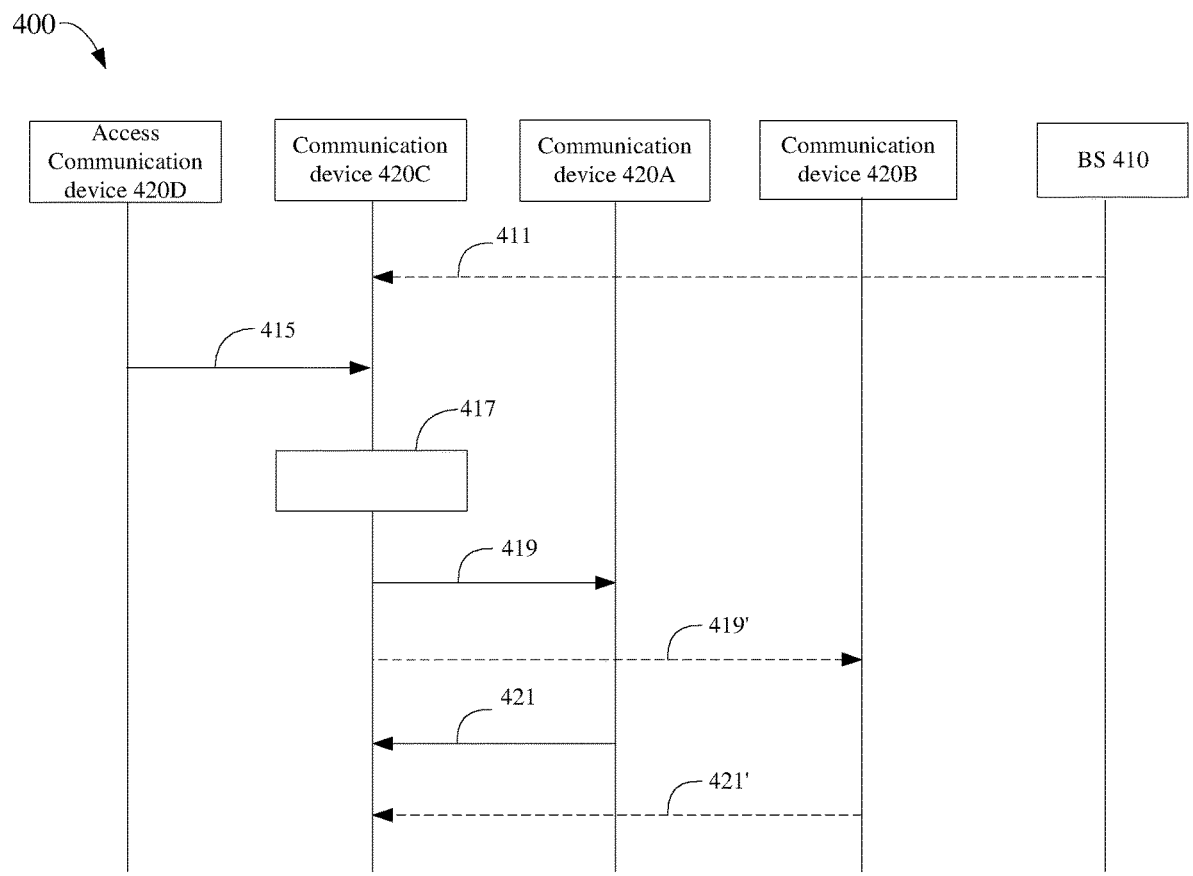
FIG. 4 illustrates a flow chart of an exemplary procedure of handling a UL transmission according to some embodiments of the present disclosure.

FIG. 4 illustrates a flow chart of exemplary procedure 400 handling a UL transmission according to some embodiments of the present disclosure.

In FIG. 4, multi-connectivity may be configured for a communication device (e.g., communication device 420C). For example, the communication device 420C can reach a BS 410 by hopping through a communication device 420A (route E: BS 410↔communication device 420A↔communication device 420C). The communication device 420C can also reach the BS 410 by hopping through the communication device 420B (route F: BS 410↔communication device 420B↔communication device 420C). In other words, the communication device 420A and the communication device 420B share a child node, e.g., the communication device 420C. An access communication device 420D is a child node of the communication device 420C.

Although, for simplicity, the communication device 420C is configured with dual-connectivity in FIG. 4, the communication device 420C may be connected to more than two parent nodes in accordance with some embodiments of the present disclosure. Please note that multi-connectivity may also be configured for one or more other communication devices in FIG. 4.

In some examples, the communication device 420A may function as the IAB node 220A shown in FIG. 2A or the IAB node 220A' shown in FIG. 2B, the communication device 420B may function as the IAB node 220B shown in FIG. 2A or the IAB node 220B' shown in FIG. 2B, the communication device 420C may function as the IAB node 220C shown in FIG. 2A or the IAB node 220C' shown in FIG. 2B, the access communication device 420D may function as the IAB node 220D or the UE 230 shown in FIG. 2A or the IAB node 220D' or the UE 230' shown in FIG. 2B, and the BS 310 may function as the IAB Donor 210 shown in FIG. 2A or the IAB Donor 210' shown in FIG. 2B.

Although the communication device 420A and the communication device 420B are connected to the same BS, e.g. the BS 410, in FIG. 4, the communication device 420A and the communication device 420B may be connected to different BSs in accordance with some embodiments of the present disclosure.

Referring to FIG. 4, in some embodiments of the present disclosure, the procedure 400 may include operation 411 (denoted by dotted arrow as an option). In operation 411, the BS 410 may transmit configuration information indicating association of the RLC channels between the communication device 420C and the access communication device 420D with the parent nodes (e.g., communication device 420A and communication device 420B) of the communication device 420C. In some embodiments of the present disclosure, the configuration information may further indicate mapping of logical channels between the communication device 420C and the access communication device 420D to logical channel groups.

In operation 415, the access communication device 420D may transmit a BSR for uplink transmission to communication device 420C. The uplink transmission will be carried by at least one RLC channel. In operation 417, after receiving the BSR from the access communication device 420D, the communication device 420C may generate a Pre-BSR for transmitting to at least one parent node (e.g., communication device 420A) of the communication device 420C.

Although, for simplicity, as shown in FIG. 4, the communication device 420C may transmit the Pre-BSR right after receiving a BSR, the communication device 420C may transmit the Pre-BSR at any time after receiving the BSR and before the reception of UL data from access communication device 420D, for example, after the communication device 420C transmits a UL grant to the access communication device 420D (not shown in FIG. 4), in accordance with some embodiments of the present disclosure.

In operation 419, the communication device 420C may transmit the Pre-BSR to communication device 420A. In operation 421, the communication device 420A may transmit a UL grant to communication device 420C in response to the Pre-BSR. At a later time, the BS 410 may receive uplink transmission from the access communication device 420D via the communication device 420C (not shown in FIG. 4).

In some embodiments of the present disclosure, the procedure 400 may include operations 419' and 421' (denoted by dotted arrow as an option). In operation 419', the communication device 420C may transmit the Pre-BSR to communication device 420B. In operation 421', the communication device 420B may transmit a UL grant to communication device 420C in response to the Pre-BSR. The communication device 420C may determine, in operation 417, whether to transmit a Pre-BSR to the communication device 420B, based on, for example, the BSR received from the access communication device 420D.

In some embodiments of the present disclosure, in operation 411, the BS 410 may configure the communication device 420C with Multi-connectivity Scheme I. In other words, the BS 410 may configure that each RLC channel between the communication device 420C and the access communication device 420D is associated with one of the parent nodes of the communication device 420C.

For example, the BS 410 may configure that RLC channel A (which may carry uplink transmission for voice communication) between communication device 420C and access communication device 420D is associated with communication device 420A, and RLC channel B (which may carry uplink transmission for streaming media communication) between communication device 420C and access communication device 420D is associated with communication device 420B. Accordingly to such configuration, data of RLC channel A may be transmitted to the BS 410 via route E as mentioned above (i.e., through communication device 420A), and data of RLC channel B may be transmitted to the BS 410 via route F as mentioned above (i.e., through communication device 420B).

In some embodiments of the present disclosure, in operation 411, the BS 410 may configure that logical channels between the communication device 420C and the access communication device 420D that are mapped to the same logical channel group are configured to be associated with the same parent node of the communication device 420C. To put it another way, logical channels between the communication device 420C and the access communication device 420D that are configured to be associated with different parent nodes of the communication device 420C may not be configured to map to the same logical channel group; or logical channels between the communication device 420C and the access communication device 420D that are configured to be associated with the same parent nodes of the communication device 420C may not be configured to map to different logical channel group.

For example, logical channel LCH #1 and logical channel LCH #2 may respectively correspond to RLC channel #1 and RLC channel #2, which may be configured by the BS 410 to be transmitted to communication device 420A. In other words, RLC channel #1, RLC channel #2, logical channel LCH #1, and logical channel LCH #2 are configured to be associated with parent communication device 420A. Logical channel LCH #3 and logical channel LCH #4 may respectively corresponds to RLC channel #3 and RLC channel #4, which may be configured by the BS 410 to be transmitted to communication device 420B. In other words, RLC channel #3, RLC channel #4, logical channel LCH #3, and logical channel LCH #4 are configured to be associated with parent communication device 420B.

The BS 410 may configure that logical channel LCH #1 and logical channel LCH #2 are mapped to one logical channel group (e.g., LCG #A), and logical channel LCH #3 and logical channel LCH #4 are mapped to another logical channel group (e.g., LCG #B).

With such configuration, in the case that uplink transmission is to be carried by logical channels (e.g., logical channels LCH #1, LCH #3, and LCH #4) between access communication device 420D and communication device 420C, the access communication device 420D may transmit a BSR, in operation 415, indicating buffer status for at least one logical channel group (e.g., logical channel groups LCG #A and LCG #B) associated with the logical channels. For example, the BSR may indicate buffer size #A for logical channel group LCG #A and buffer size #B for logical channel group LCG #B. In some examples, there may be 100 bytes, 50 bytes, and 70 bytes to be transmitted on logical channels LCH #1, LCH #3, and LCH #4, respectively; and there may be no uplink transmission to be carried by logical channel LCH #2. In these examples, the buffer size #A may be 100 bytes, and the buffer size #B may be 120 bytes.

After receiving the BSR, the communication device 420C may generate, in operation 417, a Pre-BSR for transmitting to at least one parent node of the communication device 420C based on the received BSR.

For example, the communication device 420C may recognize that the received BSR indicates buffer size #A for logical channel group LCG #A (including logical channels LCH #1 and LCH #2) and buffer size #B for logical channel group LCG #B (including logical channels LCH #3 and LCH #4).

As described above with respect to FIG. 3, ingress logical channels of a communication device may be mapped to corresponding egress logical channels in corresponding egress logical channel groups of the communication device. Referring to FIG. 4, at the communication device 420C, ingress logical channels between the access communication device 420D and the communication device 420C may be mapped to corresponding egress logical channels between the communication device 420C and its parent nodes.

For example, in some embodiments of the present disclosure, the logical channels LCH #1 and LCH #2 in ingress logical channel group LCG #A may be mapped to one or two logical channels in the same egress logical channel group (e.g., LCG #A') between communication device 420C and communication device 420A. In this scenario, the communication device 420C may transmit, in operation 419, a Pre-BSR to communication device 420A. The Pre-BSR may indicate buffer size #A' for egress logical channel group LCG #A', the buffer size #A' may be based on at least buffer size #A for logical channel group LCG #A. In other words, the buffer size #A for logical channel group LCG #A is included (or considered) in the buffer size #A'. For example, the buffer size #A for logical channel group LCG #A may be 100 bytes, and the buffer size #A' for logical channel group LCG #A' will contain the 100 bytes for logical channel group LCG #A.

In some embodiments of the present disclosure, the logical channels LCH #1 and LCH #2 in ingress logical channel group LCG #A may be mapped to logical channels in two different egress logical channel groups (e.g., LCG #A'-1 and LCG #A'-2, respectively) between communication device 420C and communication device 420A. In this scenario, the Pre-BSR transmitted by communication device 420C to communication device 420A may indicate buffer size #A'-1 for egress logical channel group LCG #A'-1, and buffer size #A'-2 for egress logical channel group LCG #A'-2. Both buffer size #A'-1 and buffer size #A'-2 may be based on at least buffer size #A for logical channel group LCG #A. For example, the buffer size #A for logical channel group LCG #A may be 100 bytes, and both buffer size #A'-1 and buffer size #A'-2 will contain the 100 bytes for logical channel group LCG #A.

Similarly mapping may be applied to logical channels LCH #3 and LCH #4 in ingress logical channel group LCG #B. For example, logical channels LCH #3 and LCH #4 may be mapped to logical channels in the same or different egress logical channel groups between communication device 420C and communication device 420B. In this scenario, the communication device 420C may transmit, in operation 419', a Pre-BSR to communication device 420B. The buffer size information for egress LCGs in the Pre-BSR to communication device 420B may be similarly determined. For example, assuming that at least one of logical channels LCH #3 and LCH #4 is mapped to a logical channel(s) in egress logical channel group LCG #B' between communication device 420C and communication device 420B, the Pre-BSR may indicate buffer size #B' for egress logical channel group LCG #B', and the buffer size #B' may be based on at least buffer size #B for logical channel group LCG #B. For example, the buffer size #B for logical channel group LCG #B may be 120 bytes, and the buffer size #B' for logical channel group LCG #B' will contain the 120 bytes for logical channel group LCG #B.

In some embodiments of the present disclosure, the BS 410 may not limit that the logical channels between the communication device 420C and the access communication device 420D that are mapped to the same logical channel group have to be associated with the same parent node of the communication device 420C. In other words, the logical channels between the communication device 420C and the access communication device 420D in the same logical channel group may be configured to be associated with the same or different parent nodes of the communication device 420C. In these embodiments, a logical channel group indicated in a BSR transmitted from the access communication device 420D to the communication device 420C may be one of the following two types:

(1) a first type (hereinafter, "type 1 LCG") which may include logical channels configured to be associated with the same parent node of the communication device 420C; and (2) a second type (hereinafter, "type 2 LCG") which may include logical channels configured to be associated with two or more parent nodes of the communication device 420C.

In some embodiments of the present disclosure, logical channel groups indicated in a BSR may be of different types. For example, the communication device 420C may recognize that a BSR received from the access communication device 420D indicates buffer size #A for logical channel group LCG #A (including logical channels LCH #1 and LCH #2) and buffer size #B for logical channel group LCG #B (including logical channels LCH #3 and LCH #4). The communication device 420C may recognize that logical channel group LCG #A is a type 1 LCG, and logical channel group LCG #B is a type 2 LCG.

In some embodiments of the present disclosure, the logical channels in logical channel group LCG #A may be configured to be associated with communication device 420A, and the logical channels in logical channel group LCG #B may be configured to be associated with communication devices 420A and 420B.

For example, at least one of logical channels LCH #1 and LCH #2 in logical channel group LCG #A may be mapped to a logical channel(s) in egress logical channel group LCG #A' between communication device 420C and communication device 420A. In this scenario, the Pre-BSR transmitted from communication device 420C to communication device 420A in operation 419 may indicate buffer size #A' for egress logical channel group LCG #A', and the buffer size #A' may be based on at least buffer size #A for logical channel group LCG #A.

In some examples, one of logical channels LCH #3 and LCH #4 in logical channel group LCG #B may be mapped to a logical channel in egress logical channel group LCG #A' or egress logical channel group LCG #C' between communication device 420C and communication device 420A, and the other may be mapped to a logical channel in egress logical channel group LCG #B' between communication device 420C and communication device 420B. In the case that one of logical channels LCH #3 and LCH #4 is mapped to a logical channel in egress logical channel group LCG #A', buffer size #A' for egress logical channel group LCG #A' may be further based on buffer size #B for logical channel group LCG #B. For example, buffer size #A' may be a sum of buffer size #A and buffer size #B. Otherwise, for example, in the case that one of logical channels LCH #3 and LCH #4 is mapped to a logical channel in egress logical channel group LCG #C', the Pre-BSR transmitted from communication device 420C to communication device 420A may further indicate buffer size #C' for egress logical channel group LCG #C', and the buffer size #C' may be based on at least buffer size #B for logical channel group LCG #B.

In the above examples, the communication device 420C may also transmit, in operation 419', a Pre-BSR to the communication device 420B. The buffer size information in the Pre-BSR to the communication device 420B may be similarly determined. For example, as stated above, one of logical channels LCH #3 and LCH #4 in logical channel group LCG #B may be mapped to a logical channel in egress logical channel group LCG #B' between communication device 420C and communication device 420B. In this scenario, the Pre-BSR transmitted to communication device 420B may indicate buffer size #B' for egress logical channel group LCG #B', and the buffer size #B' may be based on at least buffer size #B for logical channel group LCG #B.

In some embodiments of the present disclosure, the logical channels in logical channel group LCG #A may be configured to be associated with communication device 420B, and the logical channels in logical channel group LCG #B may be configured to be associated with communication devices 420A and 420B.

For example, one of logical channels LCH #3 and LCH #4 in logical channel group LCG #B may be mapped to a logical channel in egress logical channel group LCG #A' between communication device 420C and communication device 420A, and the other may be mapped to a logical channel in egress logical channel group LCG #B' between communication device 420C and communication device 420B. In this scenario, the Pre-BSR transmitted from communication device 420C to communication device 420A may indicate buffer size #A' for egress logical channel group LCG #A', and the buffer size #A' may be based on at least buffer size #B for logical channel group LCG #B.

In the above examples, the communication device 420A may also transmit, in operation 419', a Pre-BSR to the communication device 420B. The Pre-BSR transmitted to communication device 420B may indicate buffer size #B' for egress logical channel group LCG #B', and the buffer size #B' may be based on at least buffer size #B for logical channel group LCG #B.

In some examples, one or both of logical channels LCH #1 and LCH #2 in logical channel group LCG #A may be mapped to a logical channel(s) in egress logical channel group LCG #B' or egress logical channel group LCG #D' between communication device 420C and communication device 420B. In the case that at least one of logical channels LCH #1 and LCH #2 in logical channel group LCG #A is mapped to egress logical channel group LCG #B', the buffer size #B' may be further based on buffer size #A for logical channel group LCG #A. For example, buffer size #B' may be a sum of buffer size #B and buffer size #A. In the case that both of logical channels LCH #1 and LCH #2 are mapped to egress logical channel group LCG #D', buffer size #B' is not based on buffer size #A. In the case that at least one of logical channels LCH #1 and LCH #2 is mapped to a logical channel(s) in egress logical channel group LCG #D', the Pre-BSR transmitted to communication device 420B may further indicate buffer size #D' for egress logical channel group LCG #D', and the buffer size #D' may be based on at least buffer size #A for logical channel group LCG #A.

In some embodiments of the present disclosure, logical channel groups indicated in a BSR may be of the same type. The above descriptions with respect to the generation and transmission of the Pre-BSR(s) may be similarly applied. In some example, all logical channels in a BSR to communication device 420C may be configured to be associated with only one parent node (e.g., communication device 420A) of communication device 420C. In these examples, operations 419' and 421' may be eliminated.

In some embodiments of the present disclosure, in operation 411, the BS 410 may configure the communication device 420C with Multi-connectivity Scheme II. In other words, as explained above, the BS 410 may configure that for each RLC channel between the communication device 420C and the access communication device 420D, the communication device 420C may autonomously select one associated parent node for transmitting data of the RLC channel. For example, with such configuration, communication device 420C may autonomously select one of its parent nodes (e.g., communication device 420A or communication device 420B) for transmitting data of a RLC channel based on certain criteria including, for example, channel qualities or loading of its patent nodes. The channel quality may be determined based on at least one or more of the following: Reference Signal Received Power (RSRP), Reference Signal Strength Indicator (RSSI), or Reference Signal Receiving Quality (RSRQ). Other channel quality metrics may also be employed.

In some embodiments of the present disclosure, Multi-connectivity Scheme II may be applied to a communication device by default. In these embodiments, operation 411 may be eliminated, and communication device 420C may, as the default, autonomously select one associated parent node for transmitting data of a RLC channel.

In some embodiments of the present disclosure, in the case that uplink transmission is to be carried by at least one logical channel (e.g., logical channels LCH #1, LCH #2, and LCH #3) between access communication device 420D and communication device 420C, the access communication device 420D may transmit a BSR, in operation 415, indicating the buffer status for at least one logical channel group including the at least one logical channel.

For example, the BSR received from access communication device 420D by communication device 420C in operation 415 may indicate buffer size #A for ingress logical channel group LCG #A, which may include at least ingress logical channels LCH #1 and LCH #2, and buffer size #B for ingress logical channel group LCG #B, which may include at least ingress logical channel LCH #3. Logical channels LCH #1, LCH #2, and LCH #3 may respectively correspond to RLC channel #1, RLC channel #2, and RLC channel #3, which may by default, or be configured to, be associated with two or more parent nodes (hereinafter, "associated parent nodes") of the communication device 420C.

After receiving the BSR, communication device 420C may, in operation 417, select a parent node for transmitting data of logical channels in the BSR. In other words, communication device 420C may select one associated parent node for transmitting data of each egress RLC channel corresponding to each ingress logical channel in the BSR. In some examples, communication device 420C may perform such a selection on a logical channel group basis. In other words, communication device 420C may select one parent node for transmitting data of all logical channels in the same logical channel group. In addition, communication device 420C may select the same or different parent nodes for transmitting data of logical channels in different logical channel group.

For example, communication device 420C may select one parent node (e.g., communication device 420A) for transmitting data of logical channels in the ingress logical channel group LCG #A, and may select the same (e.g., communication device 420A) or a different parent node (e.g., communication device 420B) for transmitting data of logical channels in the ingress logical channel group LCG #B based on certain criteria. Then, communication device 420C may generate Pre-BSR(s) for transmitting to the selected parent nodes.

Assuming that communication device 420C selects communication device 420A for logical channels in the ingress logical channel group LCG #A, and communication device 420B for logical channels in the ingress logical channel group LCG #B, logical channels in the ingress logical channel group LCG #A may be mapped to at least one egress logical channels between communication device 420C and communication device 420A, and logical channels in the ingress logical channel group LCG #B may be mapped to at least one egress logical channels between communication device 420C and communication device 420B. In this scenario, communication device 420C may generate a Pre-BSR (Pre-BSR #A) for transmitting to communication device 420A, and another Pre-BSR (Pre-BSR #B) for transmitting to communication device 420B.

For example, assuming that all logical channels in ingress logical channel group LCG #A are mapped to logical channels in one egress logical channel group (e.g., LCG #A'), Pre-BSR #A may indicate buffer size #A' for egress logical channel group LCG #A', and the buffer size #A' may be based on at least buffer size #A for ingress logical channel group LCG #A. Assuming that some logical channels in ingress logical channel group LCG #A are mapped to logical channels in egress logical channel group LCG #A'-1 and some logical channels in ingress logical channel group LCG #A are mapped to egress logical channel group LCG #A'-2, Pre-BSR #A may indicate buffer size #A'-1 for egress logical channel group LCG #A'-1, and buffer size #A'-2 for egress logical channel group LCG #A'-2. Both the buffer size #A'-1 and buffer size #A'-2 may be based on at least buffer size #A for ingress logical channel group LCG #A. Pre-BSR #B may be generated in a similar manner.

Communication device 420C may, in operation 419, transmit Pre-BSR #A to communication device 420A, and may, in operation 419', transmit Pre-BSR #B to communication device 420B.

In some examples, communication device 420C may select one parent node (e.g., communication device 420A) for transmitting data of all logical channels in all logical channel groups indicated in a BSR. In these examples, operations 419' and 421' may be eliminated.

In some embodiments of the present disclosure, in operation 411, the BS 410 may configure the communication device 420C with Multi-connectivity Scheme III. In other words, the BS 410 may configure that each RLC channel between the communication device 420C and the access communication device 420D is associated with two or more of the parent nodes of the communication device 420C.

For example, the BS 410 may configure that RLC channel A (which may carry uplink transmission for voice communication) between communication device 420C and access communication device 420D is associated with two or more of the parent nodes of the communication device 420C (e.g., communication devices 420A and 420B). Accordingly to such configuration, data of RLC channel A may be transmitted to the BS 410 via both route E as mentioned above (i.e., through communication device 420A) and route F as mentioned above (i.e., through communication device 420B). As stated above, in this manner, reliability in uplink transmission may be improved.

In some embodiments of the present disclosure, in operation 411, the BS 410 may configure that the logical channels between the communication device 420C and the access communication device 420D are associated with two or more parent nodes of the communication device 420C. For example, logical channel LCH #1 and logical channel LCH #2 may respectively correspond to RLC channel #1 and RLC channel #2, which may by default, or be configured to, be associated with (e.g., be transmitted to) two or more of the parent nodes of the communication device 420C (e.g., communication devices 420A and 420B). In other words, RLC channel #1, RLC channel #2, logical channel LCH #1, and logical channel LCH #2 are configured to be associated with both communication devices 420A and 420B.

With such a configuration, in the case that uplink transmission is to be carried by logical channels (e.g., logical channel LCH #1, logical channel LCH #2, or both) between access communication device 420D and communication device 420C, the access communication device 420D may transmit a BSR, in operation 415, indicating the buffer status for at least one logical channel group including the logical channels. The BSR may indicate buffer size information for the at least one ingress logical channel group, each ingress logical channel group may include at least one ingress logical channel, and each ingress logical channel may be configured to be associated with two or more of the parent nodes (hereinafter, "associated parent nodes") of the communication device 420C. After receiving the BSR, the communication device 420C may, in operation 417, generate a Pre-BSR based on the BSR, and may, for example, in operations 419 and 419', transmit the same Pre-BSR to the associated parent nodes, respectively.

For example, the BSR received from the access communication device 420D may indicate buffer size #A for ingress logical channel group LCG #A, which may include at least one ingress logical channel (e.g., ingress logical channel LCH #1). The ingress logical channel LCH #1 may be configured to be associated with both communication devices 420A and 420B. After receiving the BSR, the communication device 420C may, in operation 417, generate a Pre-BSR based on the BSR. For example, ingress logical channel LCH #1 may be mapped to egress logical channel LCH #1', which may be included in egress logical channel group LCG #A'. The Pre-BSR may indicate buffer size #A' for egress logical channel group LCG #A', and the buffer size #A' may be based on at least buffer size #A for logical channel group LCG #A. The communication device 420C may, in operations 419 and 419', transmit such a Pre-BSR to communication devices 420A and 420B, respectively.

In some embodiments of the present disclosure, Multi-connectivity Scheme III may be applied to a communication device by default. In these embodiments, operation 411 may be eliminated. For example, the communication device 420C may, by default, consider that each RLC channel between the communication device 420C and the access communication device 420D is associated with all or certain parent nodes of the communication device 420C.

Although, for simplicity, the logical channel groups in FIG. 4 may include one or two logical channels, the logical channel groups may include fewer or more logical channels in accordance with some embodiments of the present disclosure. Although, for simplicity, the BSR from access communication device 420D may indicate buffer size information for two logical channel groups in FIG. 4, the BSR may indicate buffer size information for fewer or more logical channel groups in accordance with some embodiments of the present disclosure.

Although the exemplary procedure 400 shows operations 411-421', it should be appreciated by persons skilled in the art that some of the operations 411-421' may be eliminated, without departing from the spirit and scope of the disclosure.

Figure 5:
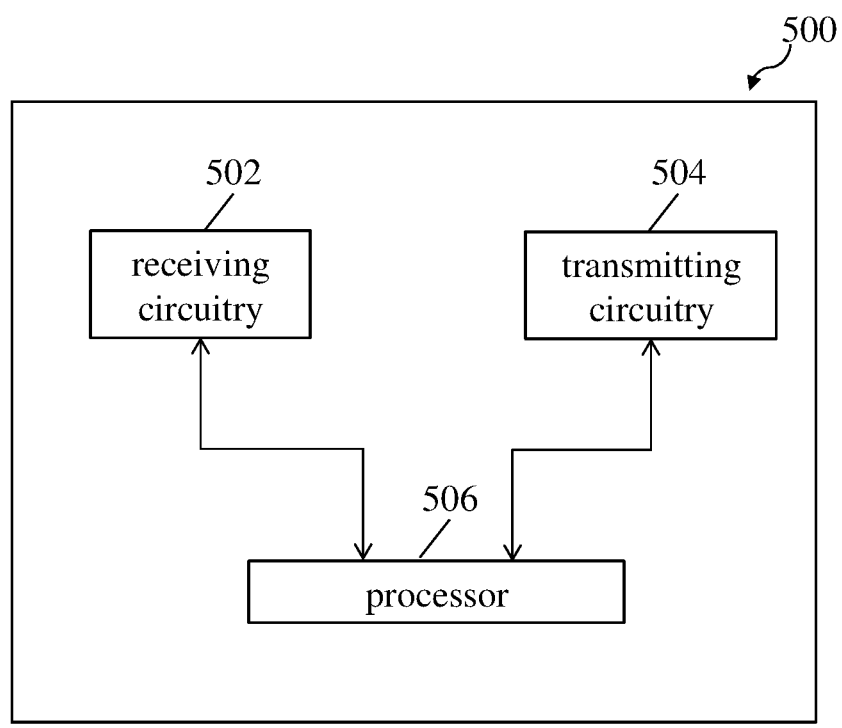
FIG. 5 illustrates an example block diagram of an apparatus according to some embodiments of the present disclosure.

FIG. 5 illustrates an example block diagram of an apparatus 500 according to some embodiments of the present disclosure.

As shown in FIG. 5, the apparatus 500 may include at least one non-transitory computer-readable medium (not illustrated in FIG. 5), a receiving circuitry 502, a transmitting circuitry 504, and a processor 506 coupled to the non-transitory computer-readable medium (not illustrated in FIG. 5), the receiving circuitry 502 and the transmitting circuitry 504. The apparatus 500 may be a BS or a communication device (e.g., an IAB node or a UE).

Although in this figure, elements such as processor 506, transmitting circuitry 504, and receiving circuitry 502 are described in the singular, the plural is contemplated unless limitation to the singular is explicitly stated. In some embodiments of the present disclosure, the receiving circuitry 502 and the transmitting circuitry 504 are combined into a single device, such as a transceiver. In certain embodiments of the present disclosure, the apparatus 500 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 506 interacting with receiving circuitry 502 and transmitting circuitry 504, so as to perform the steps with respect to the IAB nodes and UEs depicted in FIGS. 2A and 2B, and the access communication devices and the communication devices depicted in FIGS. 3 and 4.

In some embodiments of the present disclosure, the non-transitory computer-readable medium may have stored thereon computer-executable instructions to cause a processor to implement the method with respect to the BS as described above. For example, the computer-executable instructions, when executed, cause the processor 506 interacting with receiving circuitry 502 and transmitting circuitry 504, so as to perform the steps with respect to the IAB donors depicted in FIGS. 2A and 2B and the BSs depicted in FIGS. 3 and 4.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. A method performed by a communication device, the method comprising:
receiving, at the communication device and from an access communication device, a buffer status report (BSR) for uplink transmission to be carried by a plurality of radio link control (RLC) channels, wherein the communication device is connected to at least two parent nodes;
transmitting a first pre-emptive buffer status report (Pre-BSR) based on the BSR to a first parent node of the at least two parent nodes after receiving the BSR; and
receiving, from a base station, configuration information indicating association of each of the plurality of RLC channels between the communication device and the access communication device with one of the at least two parent nodes, wherein the BSR indicates a third buffer size for a first ingress logical channel group (LCG) between the communication device and the access communication device, and a fourth buffer size for a second ingress LCG between the communication device and the access communication device, a plurality of first LCHs in the first ingress LCG are configured to be associated with the same parent node, and a plurality of second LCHs in the second ingress LCG are configured to be associated with more than one parent node of the at least two parent nodes.

2. The method of claim 1, wherein the configuration information further indicates that logical channels (LCHs) from the same ingress LCGs between the communication device and the access communication device are not configured to be transmitted to different parent nodes of the communication device.

3. The method of claim 1, wherein the BSR indicates buffer size for each of ingress LCGs between the communication device and the access communication device, and LCHs in the same ingress LCG are configured to be associated with the same parent node of the communication device.

4. The method of claim 3, wherein the BSR indicates a first buffer size for a first ingress LCG of between the communication device and the access communication device, and LCHs in the first ingress LCG are configured to be associated with the first parent node.

5. The method of claim 4, wherein the first Pre-BSR indicates a second buffer size for a first egress LCG between the communication device and the first parent node, and the second buffer size for the first egress LCG is based on the first buffer size for the first ingress LCG.

6. The method of claim 1, wherein:
the first Pre-BSR indicates a fifth buffer size for a first egress LCG between the communication device and the first parent node; and
if at least one LCH in the first ingress LCG is configured to be associated with the first parent node, the fifth buffer size for the first egress LCG is based on at least the third buffer size of the first ingress LCG.

7. The method of claim 1, wherein:
the first Pre-BSR indicates a fifth buffer size for a first egress LCG between the communication device and the first parent node; and
if at least one LCH in the second ingress LCG is configured to be associated with the first parent node, the fifth buffer size for the first egress LCG is based on at least the fourth buffer size of the second ingress LCG.

8. The method of claim 1, wherein:
if at least one LCH in the second ingress LCG is configured to be associated with the first parent node, and at least one different LCH in the second ingress LCG is configured to be associated with a second parent node of the more than one parent nodes, the method further comprises transmitting a second Pre-BSR based on the BSR to the second parent node after receiving the BSR.

9. The method of claim 8, wherein:
the second Pre-BSR indicates a sixth buffer size for a second egress LCG between the communication device and the second parent node; and
the sixth buffer size for the second egress LCG is based on at least the fourth buffer size of the second ingress LCG.

10. The method of claim 1, further comprising:
selecting the first parent node from the at least two parent nodes for transmitting the first Pre-BSR after receiving the BSR from the access communication device.

11. The method of claim 10, wherein the first parent node is selected based on channel qualities or loading of the at least two parent nodes.

12. The method of claim 10, wherein the BSR indicates buffer size for each of ingress LCGs, and LCHs in the same ingress LCG are configured to be associated with the at least two parent nodes of the communication device.

13. The method of claim 12, wherein the first Pre-BSR indicates a second buffer size for a first egress LCG between the communication device and the first parent node, and the second buffer size for the first egress LCG is based on a first buffer size for a first ingress LCG indicated in the BSR.

14. The method of claim 1, further comprising:
receiving, from a base station, configuration information indicating association of RLC channels between the communication device and the access communication device with the at least two parent nodes, wherein each RLC channel is configured to be associated with two or more parent nodes of the at least two parent nodes.

15. The method of claim 14, wherein the BSR indicates buffer size for each of ingress LCGs between the communication device and the access communication device, and LCHs in a first ingress LCG between the communication device and the access communication device are configured to be associated with both of the first parent node and a second parent node of the two or more parent nodes.

16. A communication device, comprising:
at least one memory; and at least one processor coupled with the at least one memory and configured to cause the communication device to:
receive, at the communication device and from an access communication device, a buffer status report (BSR) for uplink transmission to be carried by a plurality of radio link control (RLC) channels, wherein the communication device is connected to at least two parent nodes;
transmit a first pre-emptive buffer status report (Pre-BSR) based on the BSR to a first parent node of the at least two parent nodes after receiving the BSR; and
receive, from a base station, configuration information indicating association of each of the plurality of RLC channels between the communication device and the access communication device with one of the at least two parent nodes, wherein the BSR indicates a third buffer size for a first ingress logical channel group (LCG) between the communication device and the access communication device, and a forth buffer size for a second ingress LCG between the communication device and the access communication device, a plurality of first LCHs in the first ingress LCG are configured to be associated with the same parent node, and a plurality of second LCHs in the second ingress LCG are configured to be associated with more than one parent node of the at least two parent nodes.

* * * * *